May 27, 1941.   G. E. NERNEY   2,243,767
EYEGLASS CONSTRUCTION AND METHOD OF MAKING THE SAME
Filed March 17, 1939   2 Sheets-Sheet 1
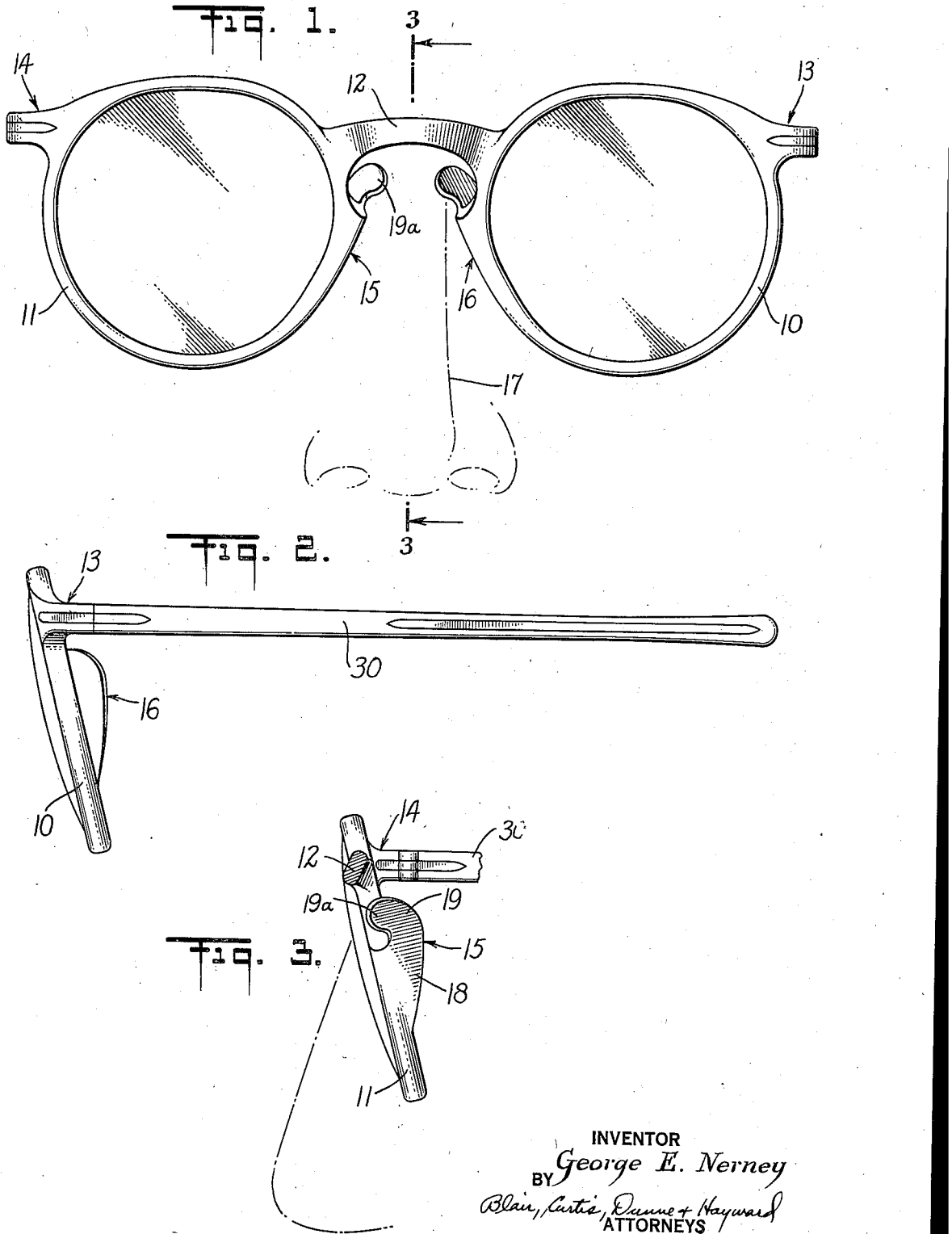
INVENTOR
George E. Nerney
BY Blair, Curtis, Dunne & Hayward
ATTORNEYS May 27, 1941.   G. E. NERNEY   2,243,767
EYEGLASS CONSTRUCTION AND METHOD OF MAKING THE SAME
Filed March 17, 1939   2 Sheets-Sheet 2
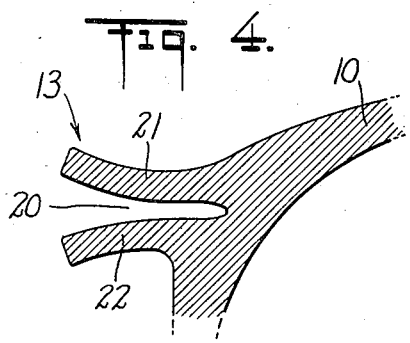
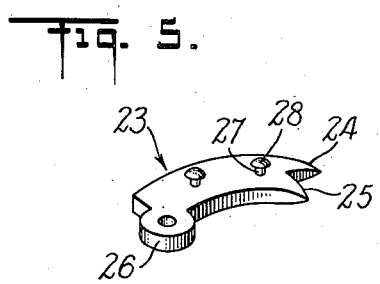
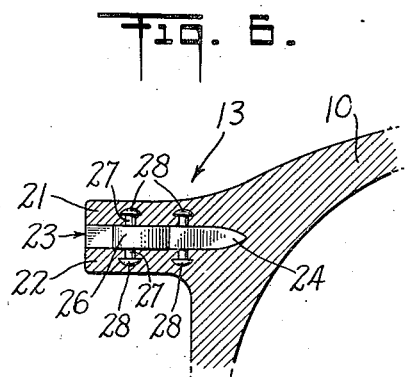
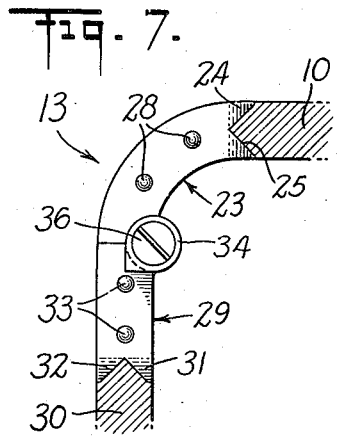
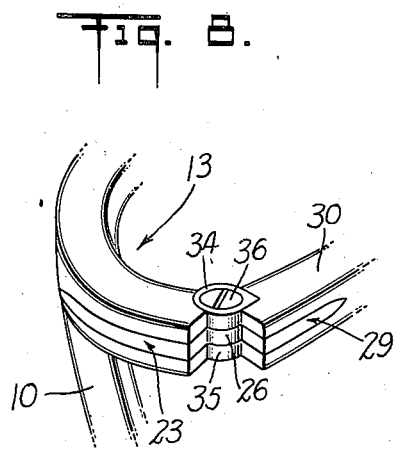
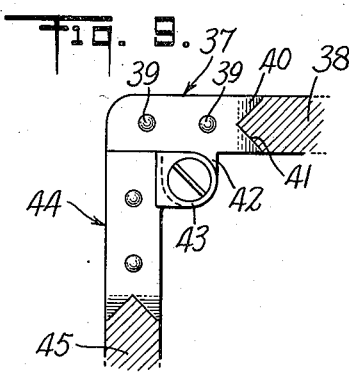
INVENTOR
George E. Nerney
BY
Blair, Curtis, Dunne & Hayward
ATTORNEYS Patented May 27, 1941

2,243,767

UNITED STATES PATENT OFFICE 2,243,767

EYEGLASS CONSTRUCTION AND METHOD OF MAKING THE SAME

George E. Nerney, Attleboro, Mass., assignor to Bay State Optical Company, Attleboro, Mass., a corporation of Maine Application March 17, 1939, Serial No. 262,341

3 Claims. (Cl. 88—53)

This invention relates to an eyeglass construction and more particularly to an eyeglass frame formed from plastic material or the like together with a method for assembling certain parts of such frame.

One of the objects of this invention is to provide an eyeglass construction which will be neat and attractive in appearance. Another object is to provide a construction of the above character which will be simple, practical and thoroughly durable. Another object is to provide a construction of the above character which materially increases the comfort of the wearer. Another object is to provide a construction of the above character which will firmly hold its position on the face of the wearer without causing undue discomfort. Another object is to provide a construction of the above character wherein metallic parts are reliably secured to the plastic material and amply safeguarded against displacement. Another object is to provide a construction of the above character wherein the metallic parts are concealed to a great extent to give a pleasing effect. Another object is to provide a method for efficiently securing metallic parts and plastic frames with minimum labor expenditure. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown several of the possible embodiments of this invention, Figure 1 is a front elevation of an eyeglass frame as mounted upon the nose of the wearer and having the features of my invention embodied therein;

Figure 2 is a side elevational view of the frame shown in Figure 1;

Figure 3 is a fragmentary side elevation of a portion of the frame shown in Figure 1 as mounted on the nose of the wearer;

Figure 4 is a vertical sectional view of a portion of the frame before assembly;

Figure 5 is a perspective view of a fitting used in the frame;

Figure 6 is a vertical sectional view through the portion of the frame shown in Figure 4 as assembled;

Figure 7 is a horizontal sectional view of a portion of the frame and temples shown in Figure 6;

Figure 8 is a fragmentary perspective view of the end portion of the frame as assembled; and Figure 9 is a horizontal sectional view of the endpiece portion of a frame which is another embodiment of my invention.

Similar reference characters refer to similar parts throughout the several views of the drawings.

As conducive to a clearer understanding of certain features of this invention, it might here be pointed out that in some eyeglass frames and particularly those formed from a plastic material such as Zylonite or the like the usual nose guard portions engage the nose at points below the upper portions of the eye sockets. Thus, these frames are harder to fit comfortably against the nose due to the fact that the frame cannot be adjusted materially without throwing the lenses off center with respect to the eyes. Furthermore, this position of the nose guard is apt to be uncomfortable. Due to the fact that Zylonite and like plastic materials are not hard enough to form bearing surfaces, it is also necessary to secure metallic parts particularly to the endpiece portions of the frame and the ends of the temples. If such parts are large enough to cover sufficient surface for reliable connection, they are often unsightly in appearance. Zylonite and these translucent materials are usually partially or completely transparent so that all connecting parts stand out in contrast. One of the objects of this invention is to provide a construction wherein the above difficulties as well as many others are successfully overcome.

Referring now to Figure 1, there is shown an eyeglass frame preferably formed from Zylonite or the like and having rims 10 and 11 connected by a bridge portion 12. Rims 10 and 11 are enlarged to form end-piece portions generally indicated at 13 and 14.

Beneath bridge 12 rims 10 and 11 are enlarged radially to form nose guard portions generally indicated at 15 and 16. These nose guard portions are substantially similar in shape and construction and accordingly only nose guard portion 15 will be described in detail.

As best shown in Figure 1, nose guard portion 15 curves gradually in an outward direction from the normal periphery of rim 10 so that it may rest upon the side portion of the nose of the wearer indicated at 17. As best seen in Figure 3, an extension 18 of nose guard 15 extends angularly and rearwardly with respect to the normal plane of rim 11 and preferably curves inwardly toward the lens so that it fits against the sloping side of the nose. Thus the rear edges of the nose pads are spaced more widely than the forward edges thereof. Furthermore, a lobe 19 extends upwardly toward bridge 12. Lobe 19 is preferably spaced to the rear of rim 11 or immediately above extension 18 and preferably terminates in a forwardly extending portion 19a substantially adjacent the forward edge of rim 11 and thus immediately below bridge 12.

As best seen in Figure 1, lobe 19 extends inwardly toward the center line of bridge 12 and nose 17 thus to fit against the side of the nose immediately adjacent the upper portion of the eye socket. Accordingly, nose guard 15 with extension 18 and lobe 19 engage a substantial portion of the side of the nose. Lobe 19, nose guard 15 and extension 18 thus distribute the weight evenly along a substantial portion of the nose.

Furthermore, lobe 19 may be easily adjusted to a suitable comfortable position which will hold the frame stable against the face of the wearer without discomfort. Because Zylonite is a particularly pliable material when heated, lobe 19 and extension 18 may be bent in any desired direction with ease thus to conform to the wearer's individual shape characteristics.

Referring now to Figure 4, endpiece portion 13, which is substantially similar to endpiece portion 14, is shown before assembly. This endpiece portion is preferably a continuation of rim 10 and extends outwardly and rearwardly, as shown in Figures 7 and 8. The endpiece portion may be formed, as shown in Figure 4, by sawing or otherwise cutting a slot 20 therein thus to provide two horizontally disposed sections 21 and 22.

By heating or otherwise sections 21 and 22 may be spread for the insertion of a metallic fitting generally indicated at 23, the details of which will be described hereinafter. After fitting 23 is inserted in slot 20, sections 21 and 22 may be heated to put them in a semi-plastic condition. In this condition sections 21 and 22 may be forced down upon fitting 23 to secure the fitting in position between the sections. As shown in Figure 5, the horizontal dimensions of fitting 23 are substantially similar in size and shape to sections 21 and 22, as will be described more fully hereinafter.

Referring now to Figure 5, fitting 23 is a flat metallic piece slightly curved to conform to the curve of the endpiece portion 13. One end thereof 24 is substantially ax-shaped in vetrical dimensions, that is it gradualy tapers in substantially the same manner as an ax head. End 24 does not come to an edge like an ax for it is preferably provided with a V-shaped groove 25. Extending from the opposite end of fitting 23 is a flat eye portion 26.

The resulting structure, after fitting 23 has been inserted in slot 20 and sections 21 and 22 have been brought together thereon in assembled condition, is best shown in Figure 6. Thus, projections 27 extend from each flat side of fitting 23 and are provided with heads 28 preferably mushroom in shape. Projections 27 are firmly embedded in sections 21 and 22 of endpiece portion 13. Accordingly, fitting 23 not only extends a substantial distance into the endpiece portion so that end 24 may be firmly embedded against displacement but also the projections 27 serve to further the stability of the entire structure.

Referring now to Figure 7, a fitting generally indicated at 29, very similar in construction to fitting 23, is embedded in the end of temple 30. Temple 30 is preferably formed from the same material as rim 10 and is also provided with a suitable slot (not shown) into which the fitting 29 may be inserted. This assembly may be carried out in a manner substantially similar to that described with respect to endpiece portion 13 and fitting 23. Thus, fitting 29 has an ax-shaped end 31 and a V-shaped groove 32. Fitting 29 is also provided with projections 33 preferably having the same type of mushroom heads (not shown). At the opposite end of fitting 29 there are provided a pair of spaced eye portions 34 and 35 substantially similar in size and dimensions to eyes 26 (Figure 5). Thus, eye portions 34 and 35 may fit over eye portion 26 and are held in this position by a screw 36 while temple 30 is pivotally connected to endpiece portion 13.

It will now be seen that fittings 23 and 29 extend a substantial distance into endpiece 13 and temple 30 thus to be securely embedded in this position. Furthermore, they are held firmly against displacement by the projections 27 and 33. But, in spite of the large area covered by these fittings to assure a reliable connection against displacement, very little of the metal shows on the outer surface of the endpiece portion 13 and temple 30, as will be clear from a consideration of Figure 8.

In Figure 9 there is shown a modification of the above structure particularly suited for that type of endpiece and temple connection which is substantially right angular as distinguished from the curved connection shown in Figures 7 and 8. Thus, I provide a metallic fitting generally indicated at 37 substantially similar in construction to fitting 23 except that it is straight to conform with the straight endpiece portion 38 of this frame. Fitting 37 is provided with the usual projections 39 as well as an ax-shaped end 40 with a V groove 41. An eye portion 42 extends from the inner side of fitting 37 to interfit with an eye portion generally indicated at 44 embedded in a temple 45 substantially similar in construction and position to fitting 29 (Figure 7). So that endpiece portion 38 and temple 45 will maintain a substantially right angular position when open, eye portions 42 and 43 have been located on the sides of the fittings as will be clear from a consideration of the drawings.

It will thus be seen that I have provided a thoroughly practical and efficient construction in which the several objects hereinabove referred to as well as many others have been successfully accomplished.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In eyeglass construction, in combination, an eyeglass frame formed from material substantially plastic in character and having an endpiece portion, said endpiece having a slot therein extending in substantially a horizontal plane with respect to the normal position of the frame when worn, a flat metallic part substantially filling said slot, and projections formed on said flat metallic part extending into said non-metallic endpiece, the inner end of said flat metallic part being ax-shaped in vertical dimensions so that it tapers to an edge which extends substantially horizontally across said endpiece.

2. The herein described art which includes the steps of forming from a plastic material an eyeglass frame, forming imperforate integral spaced projections on said frame, forming a flat metal part to a width equal to the space between said projections, forming on opposite sides of said part a plurality of headed over pins, then in the order named heating said projections, spreading said projections, placing said metal part between said projections, and forcing said projections against the opposite sides of said metal part to cause the plastic material to flow about said headed pins until they are completely embedded in said projections.

3. In eyeglass construction, in combination, an integral eyeglass frame formed from a plastic material and having extending therefrom integral spaced projections forming an endpiece, a relatively flat metal part disposed between said projections, each of two sides of said part having extending therefrom two or more headed over pins integrally formed with said part and spaced from each other, the shanks and heads of which are substantially completely embedded in the plastic material forming said projections.

GEORGE E. NERNEY.